United States Patent
Long

(10) Patent No.: US 12,113,872 B1
(45) Date of Patent: Oct. 8, 2024

(54) METHOD FOR PROVIDING A SERVICE

(71) Applicant: NCR Voyix Corporation, Atlanta, GA (US)

(72) Inventor: Justin Long, Kennesaw, GA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 18/385,652

(22) Filed: Oct. 31, 2023

(51) Int. Cl.
*H04L 67/53* (2022.01)
*G06Q 20/10* (2012.01)

(52) U.S. Cl.
CPC ......... *H04L 67/53* (2022.05); *G06Q 20/1085* (2013.01)

(58) Field of Classification Search
None
See application file for complete search history.

(56) References Cited

U.S. PATENT DOCUMENTS

| | | | | |
|---|---|---|---|---|
| 2018/0198692 | A1* | 7/2018 | Ansari | H04L 67/567 |
| 2019/0141041 | A1* | 5/2019 | Bhabbur | H04L 9/3228 |
| 2019/0174449 | A1* | 6/2019 | Shan | H04W 60/04 |

OTHER PUBLICATIONS

Sridharan et al., "Architecture of automated reservation system using automated teller machine", Jan. 1, 2016, IEEE, 2016 10th International Conference on Intelligent Systems and Control (ISCO) (2016, pp. 1-6) (Year: 2016).*

* cited by examiner

*Primary Examiner* — Davoud A Zand
(74) *Attorney, Agent, or Firm* — Notaro, Michalos & Zaccaria P.C.; John S. Economou

(57) ABSTRACT

A data processing system includes a first communication session participant device, a service orchestration controller, and a plurality of second communication session participant devices. Each of the second communication session participants has an attribute to perform a type of service task. The service orchestration controller receives a service request message from the first communication session participant device, determines a control message based on the service request message, retrieves technical capability parameters of each of the second communication session participant devices, selects an optimum second communication session participant device from the plurality of second communication session participant devices based on the technical capability parameters and based on the attributes, transmits the control message to the optimum second communication session participant device to process the service request, receives a service outcome message from the optimum second communication session participant device, and provides output data to the first communication session participant device.

16 Claims, 2 Drawing Sheets

METHOD FOR PROVIDING A SERVICE

FIELD OF THE INVENTION

This invention relates to a computer-implemented method for providing a service.

BACKGROUND

It is known for a customer to perform various financial actions when located at an automated teller machine (ATM), such as withdrawing cash or lodging cheques. It is also known for a customer to discuss financial products and services with a bank teller in a bank branch, such as requesting a cash withdrawal with a particular denomination of banknotes. However known approaches frequently require a customer to wait for a period of time to receive the requested service. In addition some customers may find it difficult or even impossible to operate certain ATMs.

This invention is aimed at providing an improved method which overcomes at least some of these difficulties.

SUMMARY

According to the invention there is provided a computer-implemented method for providing a service, the method comprising the steps of:
  receiving a service request message from a first communication session participant device,
  determining a control message based on the service request message,
  retrieving one or more technical capability parameters of a plurality of second communication session participant devices,
  selecting an optimum second communication session participant device from the plurality of second communication session participant devices based on the one or more technical capability parameters, and
  transmitting the control message to the optimum second communication session participant device to process the service request.

The method of the invention may pair several capabilities together. The method of the invention may pair several capabilities of the same type together. The capabilities may use a naming hierarchy that starts broad and becomes successively more specific. The method of the invention may use "."s as delimited. For example, "communication.video.vidyo.platform.room" pairs with "communication.video.vidyo.platform.client". A participant may support more than one video platform. A participant may also have "communication.video.webrtc.room", if that is all the participant has, the participant will not be paired with another participant that does not have "communication.video.webrtc.client".

The method of the invention may choose to route based on other factors, such as: time of day, call centre wait times, costs. One video communication platform may have a higher cost per minute than another communication platform.

The method of the invention may also route in a similar manner based on the skills of a participant. The skills may follow a similar name hierarchy as the capabilities, and all participants may be assigned skills. For example, "language.en-us", "financial.banking.customer-service", "financial.banking.teller", "financial.banking.mortgage.originator", etc. If there are no completely compatible options, the method of the invention may route to the closest match by moving down the hierarchy. So if the participant requests "financial.banking.teller" and there are none available but there is a "financial.banking.customer-service", the method of the invention may route to the "financial.banking.customer-service". Unless the method of the invention determines that this would not be compatible. The method of the invention may be adjusted based on customer needs.

Because the optimum second communication session participant device is selected based on the technical capability parameters, this ensures that the correct second communication session participant device is chosen to process the service request. This avoids the problems of attempting to process the service request on a device that lacks essential hardware equipment, or essential software applications, or is incapable of processing the service request in some other way. The invention thus ensures that the customer will receive the requested service without delay.

The first communication session participant device may be located remotely from the second communication session participant device. For example, the first communication session participant device may be a mobile device operated by a customer, and the second communication session participant device may be a teller machine located remotely from the mobile device. Alternatively the first communication session participant device may be a mobile device operated by a customer, the second communication session participant device may be a teller machine, and the customer may be standing in proximity to the teller machine.

The first communication session participant may comprise a customer. The service request message may comprise a customer care request. The invention ensures that the optimum customer care device is selected based on the technical capability parameters. By choosing the correct customer care device, the invention ensures that the customer will be assisted, For example, to operate an ATM to receive the required service. This avoids the problems of routing the customer care request to a customer care device that lacks essential hardware equipment, or essential software applications, or is incapable of processing the service request in some other way. The invention thus ensures that the customer will be assisted without delay.

The second communication session participant device may comprise at least one of a teller machine, a cash dispenser device, a printer device, a display device, a user interface device, a document scanner device, an Internet of Things (IoT) enabled device, an automated machine, a machine learning tool, a customer care representative device, a software application, or a computer program. The second communication session participant device may comprise at least one of a retail device, a hospitality device, a point of sale device, a fuel dispensing device, or a gas pump device.

The technical capability parameter may comprise at least one of video communication capability for a pre-defined video communication platform, audio communication capability, capability to remotely control a teller machine to execute a teller machine task, data display capability, or a latest software application version. The teller machine task may comprise at least one of dispense a media, print a document, scan a document, receive user input data, or receive a communication message. The teller machine task may comprise at least one of scan a fingerprint, sense a biometric parameter, receive user input at a pin pad, read a magnetic card, receive near field communication (NFC) data.

The method may comprise the step of accessing one or more databases of technical capability parameters to retrieve the one or more technical capability parameters of the plurality of second communication session participant devices. The databases may be located remotely from the first communication session participant device and from the second communication session participant device. The databases may be supplemented with updated technical capability parameters over time.

Each second communication session participant may have an attribute to perform a type of service task, and the method may comprise the step of selecting the optimum second communication session participant device from the plurality of second communication session participant devices based on the attributes. Because the optimum second communication session participant device is selected based on the attributes, this ensures that the correct second communication session participant device is chosen to perform the required service task. This avoids the problems of attempting to process the service request when a task cannot be performed. The invention thus ensures that the customer will receive the requested service without delay. The attribute may comprise an authorisation level. The attribute may comprise a skill.

The method may comprise the step of receiving a service outcome message from the optimum second communication session participant device. The method may comprise the step of providing output data to the first communication session participant device.

In another aspect of the invention there is provided a data processing system for providing a service, the system comprising a processor configured to:
 receive a service request message from a first communication session participant device,
 determine a control message based on the service request message,
 retrieve one or more technical capability parameters of a plurality of second communication session participant devices,
 select an optimum second communication session participant device from the plurality of second communication session participant devices based on the one or more technical capability parameters, and
 transmit the control message to the optimum second communication session participant device to process the service request.

Because the optimum second communication session participant device is selected based on the technical capability parameters, this ensures that the correct second communication session participant device is chosen to process the service request. This avoids the problems of attempting to process the service request on a device that lacks essential hardware equipment, or essential software applications, or is incapable of processing the service request in some other way. The invention thus ensures that the customer will receive the requested service without delay.

The system may comprise a service orchestration controller.

The invention also provides in another aspect a computer program product stored on a non-transitory computer readable storage medium, the computer program product comprising instructions capable of causing a computer system to perform a method of the invention when the computer program product is executed on the computer system.

BRIEF DESCRIPTION OF THE DRAWINGS

Embodiments of the invention will be described hereinafter, by way of example only, with reference to the accompanying drawings, in which.

DETAILED DESCRIPTION

Figure 1:
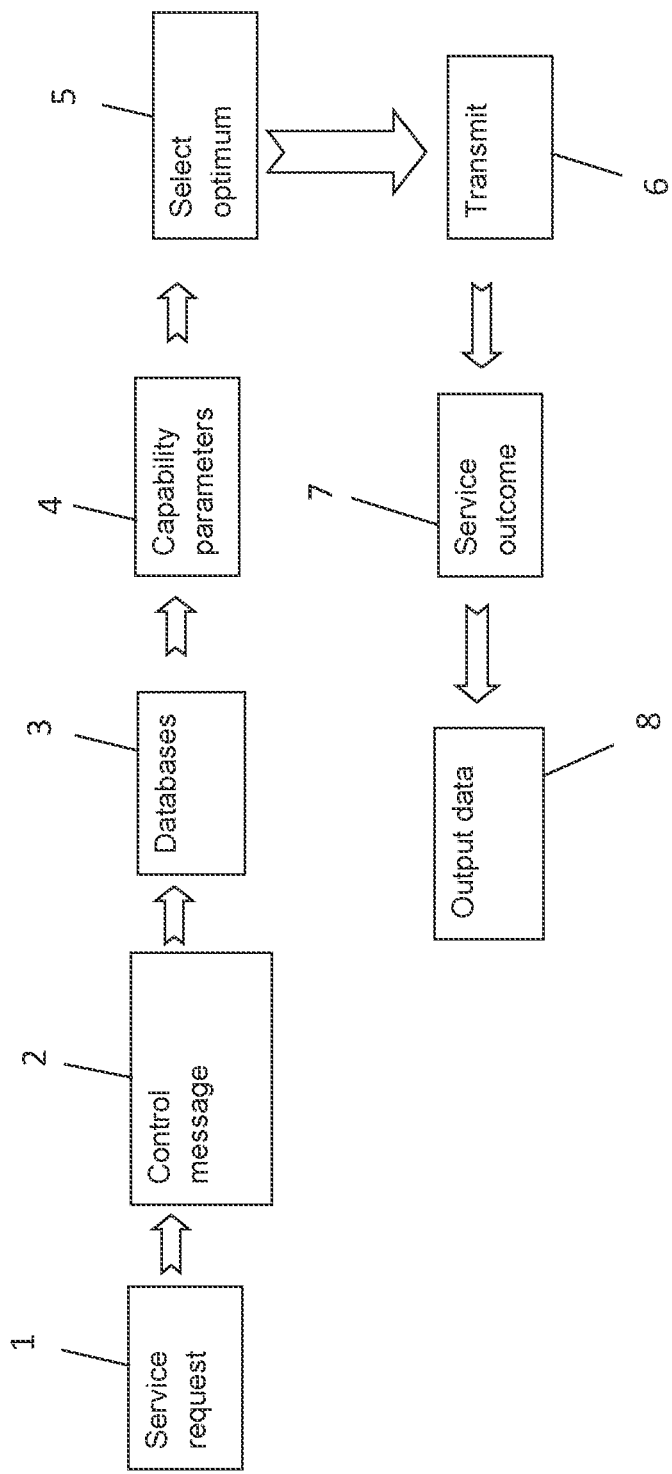
FIG. 1 is a flow diagram of a method according to the invention for providing a service.

Referring to FIG. 1 there is illustrated a data processing system according to the invention in use. The system may be employed to provide a service, such as to provide a financial transaction service.

In this case the system includes a first communication session participant device, a service orchestration controller, and a plurality of second communication session participant devices.

The first communication session participant device is located remotely from the service orchestration controller, and the first communication session participant device is located remotely from the second communication session participant devices. For example, the first communication session participant may be a customer, and the first communication session participant device may be a mobile device operated by the customer.

The service orchestration controller is located remotely from the second communication session participant devices. For example, the service orchestration controller may be provided in a central server.

For example, the second communication session participant device may be a teller machine, or a cash dispenser device, or a printer device, or a display device, or a user interface device, or a document scanner device, or an Internet of Things (IoT) enabled device, or an automated machine, or a machine learning tool, or a customer care representative device, or a software application, or a computer program.

Each of the second communication session participants has an attribute to perform a type of service task.

For example, the attribute may be a transaction limit or an authorisation level. In this case one communication session participant may be a bank teller with a lower transaction limit/authorisation level to enable the bank teller to process financial transactions below a pre-defined threshold value, such as $10,000. An alternative communication session participant may be a supervisor with a higher transaction limit/authorisation level to enable the supervisor to process financial transactions of any value.

As another example the attribute may be a skill, such as translating from one language into another language. In this case one communication session participant may be a bank teller with an ability to communicate with a customer in one language, For example, in English. An alternative communication session participant may be an interpreter with language skills necessary to communicate with a customer in one language, For example, in Spanish, and to translate into another language, For example, into English, to communicate with the bank teller to allow the requested service to be processed.

The service orchestration controller receives a service request message 1 from the first communication session participant device. For example, the service request message 1 may be a request for customer care to assist the customer in operating an ATM.

The service orchestration controller determines a control message 2 based on the service request message 1.

The service orchestration controller accesses a plurality of databases 3 of technical capability parameters. The service orchestration controller retrieves the technical capability parameters 4 of each of the second communication session participant devices. For example, the technical capability parameter 4 may be video communication capability for a pre-defined video communication platform, or audio communication capability, or capability to remotely control a teller machine to execute a teller machine task, or data display capability, or a latest software application version. For example, the video communication capability may be for video communication using the Vidyo platform, or using the Zoom platform, or using the Teams platform, or using the Polycom platform. For example, the data display capability may be to display a financial transaction summary or a message or a survey. For example, the teller machine task may be dispense a media, such as cash. For example, the teller machine task may be print a document, such as a financial transaction receipt or an account statement. For example, the teller machine task may be scan a document or an identification card. For example, the teller machine task may be receive user input data, such as numeric data input or text data input. For example, the teller machine task may be receive a communication message, such as in a SMS format or in an e-mail message format.

The service orchestration controller selects an optimum second communication session participant device 5 from the plurality of second communication session participant devices based on the technical capability parameters 4, and based on the attributes.

The service orchestration controller transmits 6 the control message 2 to the optimum second communication session participant device 5 to process the service request.

The service orchestration controller receives a service outcome message 7 from the optimum second communication session participant device 5. For example, the service outcome message 7 may indicate if the service has been successfully completed at the optimum second communication session participant device 5. The service orchestration controller provides output data 8 to the first communication session participant device. For example, the output data 8 may be a notification to the customer that the service has been successfully completed at the optimum second communication session participant device 5.

Figure 2:
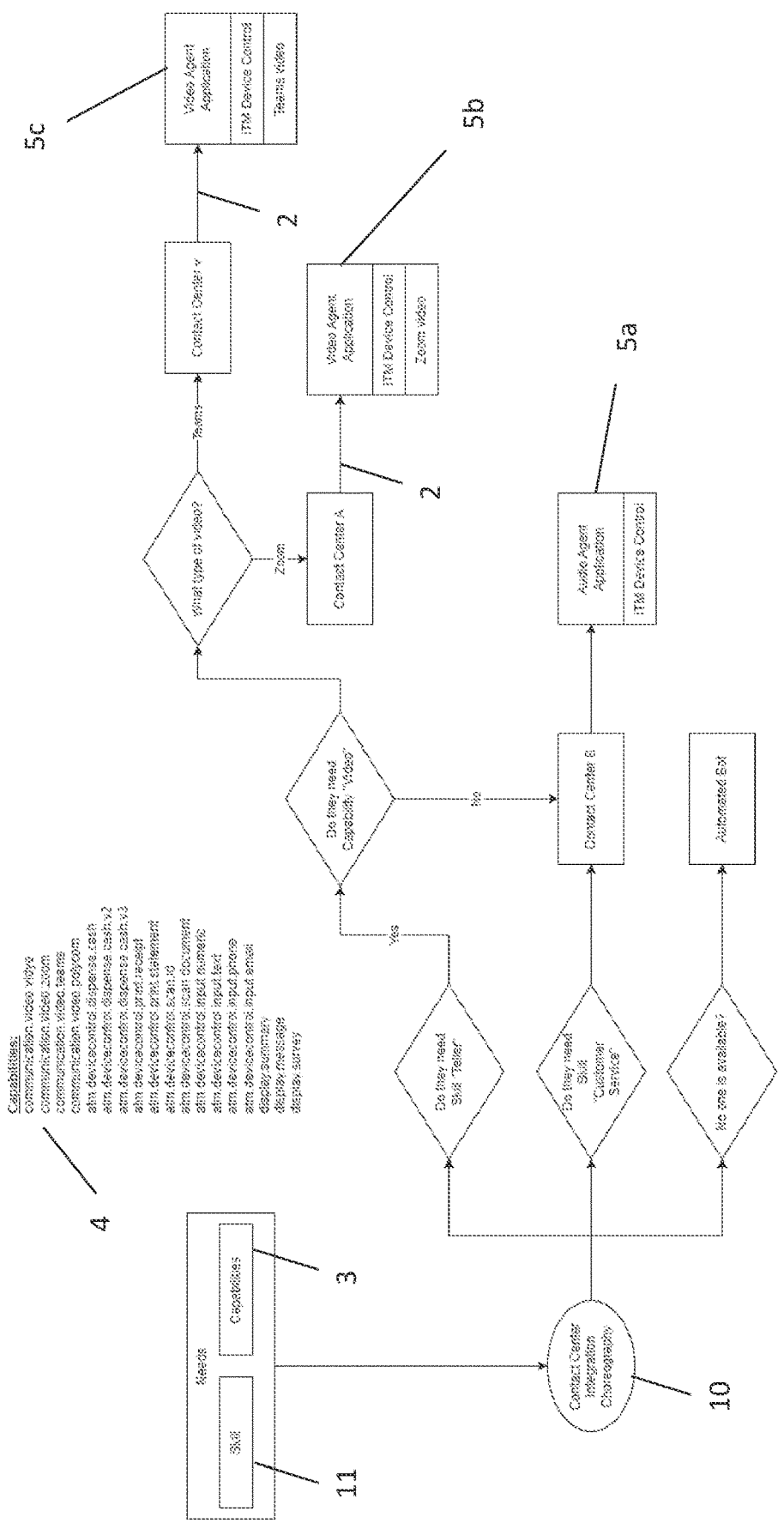
FIG. 2 is a flow diagram of another method according to the invention for providing a service.

FIG. 2 illustrates the data processing system according to the invention in use.

The service orchestration controller 10 receives a service request message 1 from the first communication session participant device. For example, the service request message may be a request for customer care to assist the customer in operating an ATM.

The service orchestration controller 10 determines a control message 2 based on the service request message 1.

The service orchestration controller 10 accesses a plurality of databases 3 of technical capability parameters. The service orchestration controller 10 retrieves the technical capability parameters 4 of each of the second communication session participant devices. For example, the technical capability parameter 4 may be video communication capability for a pre-defined video communication platform, or audio communication capability, or capability to remotely control a teller machine to execute a teller machine task, or data display capability, or a latest software application version. For example, the video communication capability may be for video communication using the Vidyo platform, or using the Zoom platform, or using the Teams platform, or using the Polycom platform. For example, the data display capability may be to display a financial transaction summary or a message or a survey. For example, the teller machine task may be dispense a media, such as cash. For example, the teller machine task may be print a document, such as a financial transaction receipt or an account statement. For example, the teller machine task may be scan a document or an identification card. For example, the teller machine task may be receive user input data, such as numeric data input or text data input. For example, the teller machine task may be receive a communication message, such as in a SMS format or in an e-mail message format.

The service orchestration controller 10 selects an optimum second communication session participant device 5a, 5b, 5c from the plurality of second communication session participant devices based on the technical capability parameters 4 and based on the attributes 11. For example, the service orchestration controller 10 may select the audio agent second communication session participant device 5a if the technical capability parameter 4 is audio communication capability. For example, the service orchestration controller 10 may select the video agent second communication session participant device 5b if the technical capability parameter 4 is video communication capability using the Zoom platform. For example, the service orchestration controller 10 may select the video agent second communication session participant device 5c if the technical capability parameter 4 is video communication capability using the Teams platform.

The service orchestration controller 10 transmits 6 the control message 2 to the optimum second communication session participant device 5a, 5b, 5c to process the service request.

The service orchestration controller 10 receives a service outcome message 7 from the optimum second communication session participant device 5a, 5b, 5c. For example, the service outcome message 7 may indicate if the service has been successfully completed at the optimum second communication session participant device 5a, 5b, 5c. The service orchestration controller 10 provides output data 8 to the first communication session participant device. For example, the output data 8 may be a notification to the customer that the service has been successfully completed at the optimum second communication session participant device 5a, 5b, 5c.

Throughout the description and claims of this patent specification, the words "comprise" and "contain" and variations of them mean "including but not limited to" and they are not intended to and do not exclude other moieties, additives, components, integers or steps. Throughout the description and claims of this patent specification, the singular encompasses the plural unless the context otherwise requires. In particular, where the indefinite article is used, the patent specification is to be understood as contemplating plurality as well as singularity, unless the context requires otherwise.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

Features, integers, characteristics or groups described in conjunction with a particular aspect, embodiment or example of the invention are to be understood to be applicable to any other aspect, embodiment or example described herein unless incompatible therewith. All of the features disclosed in this patent specification including any accompanying claims, abstract and drawings, and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this patent specification including any accompanying claims, abstract and drawings, or to any novel one, or any novel combination, of the steps of any method or process so disclosed.

I claim:

1. A computer-implemented method for providing a service, the method comprising the steps of:
   receiving a service request message from a first communication session participant device,
   determining a control message based on the service request message,
   retrieving one or more technical capability parameters of a plurality of second communication session participant devices,
   selecting an optimum second communication session participant device from the plurality of second communication session participant devices based on the one or more technical capability parameters, and
   transmitting the control message to the optimum second communication session participant device to process the service request.

2. A method as claimed in claim 1 wherein the first communication session participant device is located remotely from the second communication session participant device.

3. A method as claimed in claim 1 wherein the first communication session participant comprises a customer.

4. A method as claimed in claim 1 wherein the service request message comprises a customer care request.

5. A method as claimed in claim 1 wherein the second communication session participant device comprises at least one of a teller machine, a cash dispenser device, a printer device, a display device, a user interface device, a document scanner device, an Internet of Things (IoT) enabled device, an automated machine, a machine learning tool, a customer care representative device, a software application, or a computer program.

6. A method as claimed in claim 1 wherein the technical capability parameter comprises at least one of video communication capability for a pre-defined video communication platform, audio communication capability, capability to remotely control a teller machine to execute a teller machine task, data display capability, or a latest software application version.

7. A method as claimed in claim 6 wherein the teller machine task comprises at least one of dispense a media, print a document, scan a document, receive user input data, or receive a communication message.

8. A method as claimed in claim 1 wherein the method comprises the step of accessing one or more databases of technical capability parameters to retrieve the one or more technical capability parameters of the plurality of second communication session participant devices.

9. A method as claimed in claim 1 wherein each second communication session participant has an attribute to perform a type of service task, and the method comprises the step of selecting the optimum second communication session participant device from the plurality of second communication session participant devices based on the attributes.

10. A method as claimed in claim 9 wherein the attribute comprises an authorisation level.

11. A method as claimed in claim 9 wherein the attribute comprises a skill.

12. A method as claimed in claim 1 wherein the method comprises the step of receiving a service outcome message from the optimum second communication session participant device.

13. A method as claimed in claim 12 wherein the method comprises the step of providing output data to the first communication session participant device.

14. A data processing system for providing a service, the system comprising a processor configured to:
   receive a service request message from a first communication session participant device,
   determine a control message based on the service request message,
   retrieve one or more technical capability parameters of a plurality of second communication session participant devices,
   select an optimum second communication session participant device from the plurality of second communication session participant devices based on the one or more technical capability parameters, and
   transmit the control message to the optimum second communication session participant device to process the service request.

15. A system as claimed in claim 14 wherein the system comprises a service orchestration controller.

16. A computer program product stored on a non-transitory computer readable storage medium, the computer program product comprising instructions capable of causing a computer system to perform, when the computer program product is executed on the computer system, the following method:
   receiving a service request message from a first communication session participant device,
   determining a control message based on the service request message,
   retrieving one or more technical capability parameters of a plurality of second communication session participant devices,
   selecting an optimum second communication session participant device from the plurality of second communication session participant devices based on the one or more technical capability parameters, and
   transmitting the control message to the optimum second communication session participant device to process the service request.

* * * * *